United States Patent
Denifl et al.

(10) Patent No.: US 10,035,866 B2
(45) Date of Patent: Jul. 31, 2018

(54) METHOD FOR PRODUCING AN OLEFIN POLYMERIZATION CATALYST

(71) Applicant: BOREALIS AG, Vienna (AT)

(72) Inventors: Peter Denifl, Helsinki (FI); Timo Leinonen, Tolkkinen (FI); Pasi Matikainen, Espoo (FI); Tom Elovirta, Porvoo (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/033,395

(22) PCT Filed: Oct. 30, 2014

(86) PCT No.: PCT/EP2014/073318
§ 371 (c)(1),
(2) Date: Apr. 29, 2016

(87) PCT Pub. No.: WO2015/063204
PCT Pub. Date: May 7, 2015

(65) Prior Publication Data
US 2016/0272735 A1    Sep. 22, 2016

(30) Foreign Application Priority Data

Oct. 31, 2013   (EP) .................................... 13191103

(51) Int. Cl.
*C08F 10/00*    (2006.01)
*B01J 31/14*    (2006.01)
(Continued)

(52) U.S. Cl.
CPC ............. *C08F 10/00* (2013.01); *B01J 31/143* (2013.01); *B01J 31/1608* (2013.01);
(Continued)

(58) Field of Classification Search
None
See application file for complete search history.

(56) References Cited

U.S. PATENT DOCUMENTS 4,543,637 A     9/1985  Smith et al.
5,236,624 A  *  8/1993  Lepert ........................ C08J 3/03
                                                           366/14
(Continued)

FOREIGN PATENT DOCUMENTS

WO    2003000754 A1    1/2003
WO    2003000757 A1    1/2003
(Continued)

OTHER PUBLICATIONS

International Search Report issued in related International Application No. PCT/EP2014/073318 dated Dec. 22, 2014.

*Primary Examiner* — Catherine S Branch
(74) *Attorney, Agent, or Firm* — Meunier Carlin & Curfman LLC

(57) ABSTRACT

The present invention is directed to a process for producing a solid olefin polymerization catalyst component from an emulsion wherein the particle size of the solid catalyst or the droplet size of the emulsion is controlled. The actual size of the droplets or the solid catalyst particles is measured, or alternatively, both are measured. Then a difference between the actual size and the set point is calculated and the process is controlled based on the difference.

12 Claims, 6 Drawing Sheets

(51) Int. Cl.
- *B01J 31/16* (2006.01)
- *B01J 31/22* (2006.01)
- *G05B 13/00* (2006.01)
- *B01J 35/02* (2006.01)

(52) U.S. Cl.
CPC .......... *B01J 31/2295* (2013.01); *G05B 13/00* (2013.01); *B01J 35/023* (2013.01)

(56) References Cited

U.S. PATENT DOCUMENTS

| | | | |
|---|---|---|---|
| 5,632,596 | A | 5/1997 | Ross |
| 5,885,920 | A | 3/1999 | Takahashi et al. |
| 6,000,840 | A | 12/1999 | Paterson |
| 9,469,700 | B2 | 10/2016 | Kallio et al. |
| 2007/0097784 | A1 | 5/2007 | Arletti et al. |
| 2012/0277090 | A1 | 11/2012 | Spencer et al. |

FOREIGN PATENT DOCUMENTS

| | | |
|---|---|---|
| WO | 03051934 A2 | 6/2003 |
| WO | 2004029112 A1 | 4/2004 |
| WO | 2007137853 A1 | 5/2006 |
| WO | 2006069733 A1 | 7/2006 |
| WO | 2011058088 A1 | 5/2011 |
| WO | 2011058089 A1 | 5/2011 |
| WO | 2011058091 A1 | 5/2011 |
| WO | 2012007430 A1 | 1/2012 |

* cited by examiner

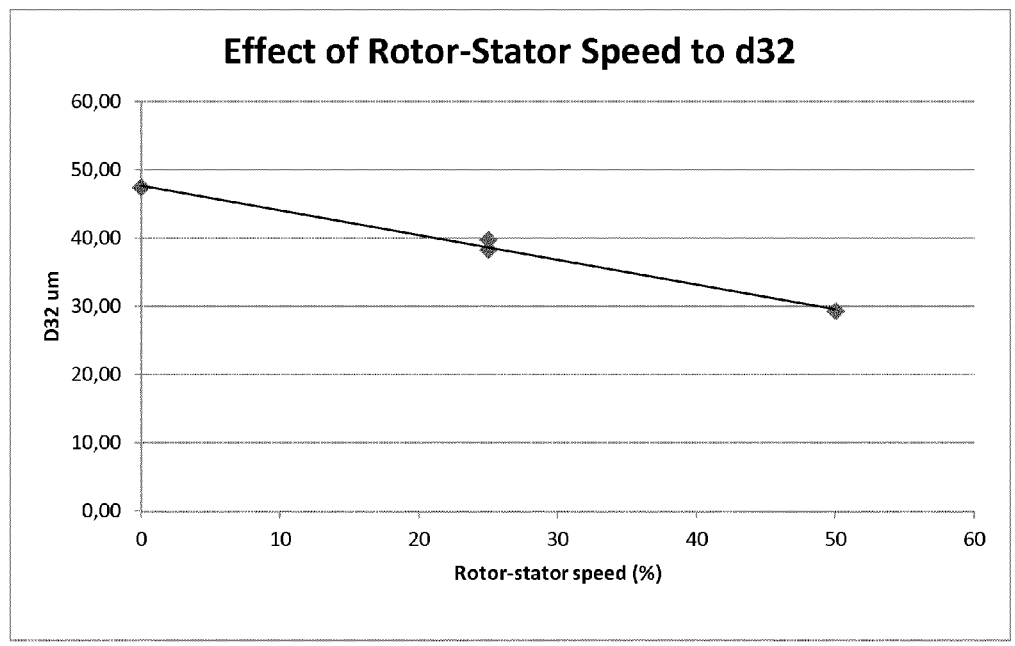
FIGURE 3: The effect of rotor-stator speed (in % from the maximum range) on the particle size (Sauter diameter) of the solid catalyst component in the process of Example 2.

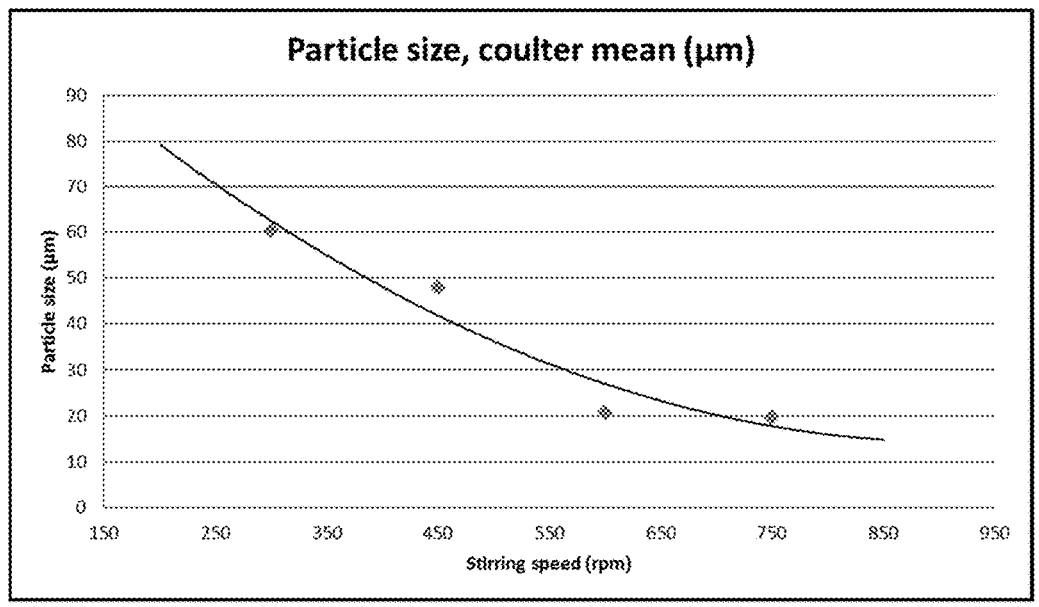
FIGURE 4: The dependency of the particle size on the stirring speed produced in the process of Example 1

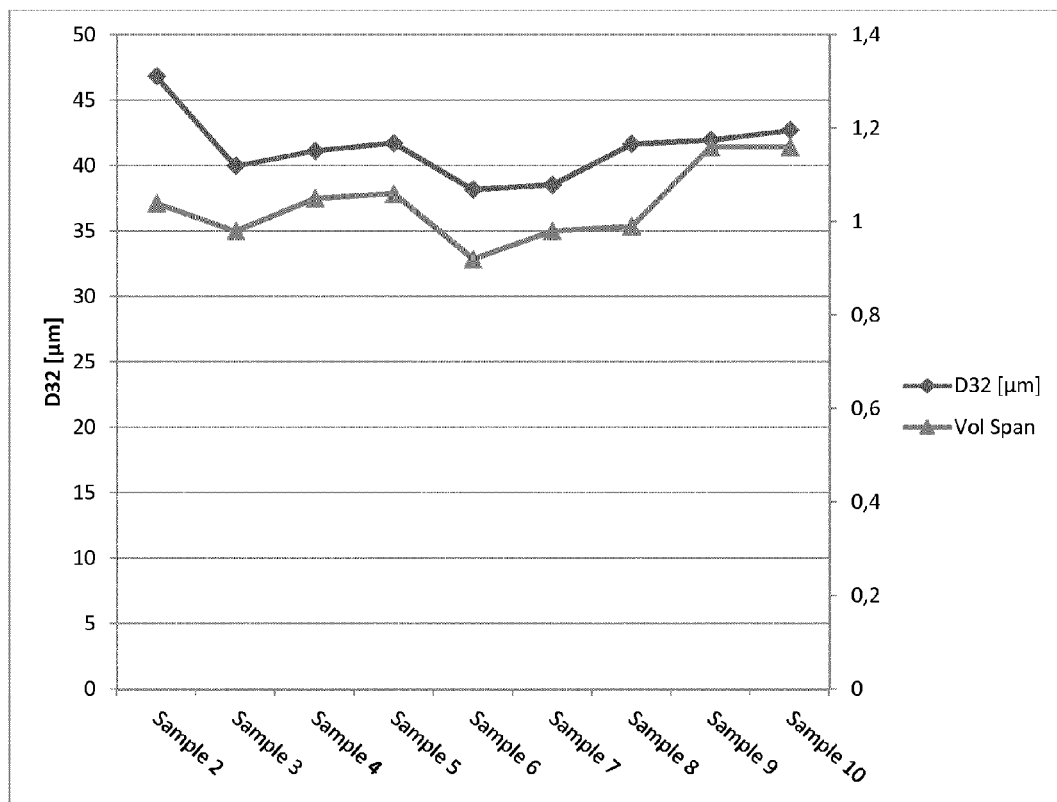
FIGURE 5: The mode particle size and span (($d_{90}$-$d_{10}$)/$d_{50}$) during the production campaign of Example 2.

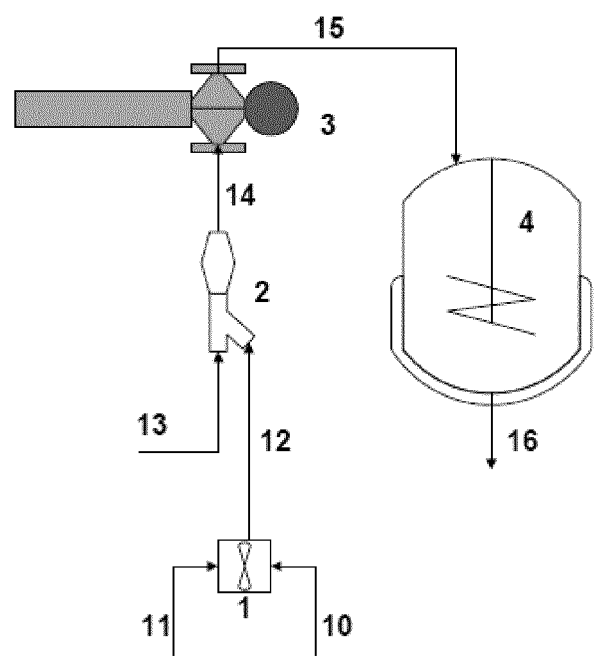
FIGURE 6: The flow chart of the process of Example 2.

METHOD FOR PRODUCING AN OLEFIN POLYMERIZATION CATALYST

FIELD OF THE INVENTION

The present invention is directed to a process for producing a component of a catalyst for olefin polymerization. More specifically, the present invention is directed to a process of producing a solid olefin polymerization catalyst component. In particular, the present invention is directed to a method of producing a solid olefin polymerization catalyst component via an emulsion method.

Problem to be Solved

The particle size of the polymerization catalyst is of major importance in commercially operating polymerization processes. As it is well known in the art, the particle size of the catalyst has a strong effect on the particle size of the polymer. Too small particle size of the polymer may cause elutriation of fine polymer particles from the process and thereby clogging of process equipment. Too large particle size, on the other hand, may cause settling of polymer in process equipment. Furthermore, variations in the particle size of the catalyst may cause problems in the catalyst manufacturing process itself, for instance during decantation, washing and sieving steps.

When the catalyst is produced via emulsion method the size of the catalyst particles after the solidification step is dependent and to a high degree pre-defined by the droplet size of the emulsion. The droplet size can be adjusted by adjusting the emulsification conditions, such as the mixing speed, as it is well known in the field.

When doing studies in the field the present inventors have found that the droplet size is also strongly dependent on other parameters which are more difficult to control or which even cannot be directly measured and which may vary during the catalyst production process, such as the local temperature at the Mg-compound feed point and the viscosity of the continuous and dispersed phase of the emulsion. Deviations in these variables can lead to a poor batch-to-batch reproducibility of the particle size and/or a broadened particle size distribution, potentially resulting in off-spec material. Especially in commercial scale catalyst plants where the batch size is in the range of hundreds of kilograms this problem can be a significant cost factor. In addition to the raw material cost the off-spec catalyst cannot be recycled and needs to be disposed of as a waste.

In addition, optimization and scale-up of the particle size is difficult as there is no direct method available for accurately predicting droplet size due to the complex and often non-linear interaction of the different parameters. This is even more so true for the particle size of the solid catalyst which generally does not equal to the droplet size of the emulsion.

The present invention aims to solve these problems and provide a process which produces a solid olefin polymerization catalyst component having a reduced batch-to-batch variation in its particle size. Furthermore, the process produces a solid catalyst component which has a pre-defined particle size and a desired particle size distribution. The process is economical and allows minimizing the production of off-spec material. The process can be operated either batch-wise or continuously.

SUMMARY OF THE INVENTION

As seen from one aspect the present invention provides a process for producing a solid olefin polymerization catalyst component from an emulsion comprising the steps of:

(i) providing a set point for the particle size of the solid olefin polymerization catalyst component;
(ii) producing in an emulsification stage the emulsion comprising droplets of a dispersed phase in a continuous phase, the droplets comprising a transition metal compound;
(iii) solidifying the droplets to produce the solid olefin polymerization catalyst component in a solidification stage;
(iv) optionally, calculating a set point for the size of the droplets in said emulsification stage from said set point for the particle size of the solid olefin polymerization catalyst component;
(v) measuring the size of the droplets in said emulsification stage, or measuring the size of the solid olefin polymerization catalyst component in or after said solidification stage and determining a measured size for the particles or droplets from said measurement;
(vi) calculating a difference between said set point and said measured size;
(vii) establishing a control signal based on said difference and using said control signal for adjusting at least one manipulated variable.

As seen from another aspect, the present invention provides a process for polymerizing at least one olefin in the presence of a polymerization catalyst comprising the steps of: (A) producing the solid catalyst component according to method described above; (B) optionally, contacting the catalyst obtained in step (A) with a cocatalyst, and (C) contacting at least one olefin with the catalyst, which optionally has been contacted with a cocatalyst.

BRIEF DESCRIPTION OF DRAWINGS

FIG. 3 shows an example of the effect of the rotor speed in rotor-stator equipment on the particle size of the solidified catalyst.

FIG. 4 shows an example of the effect of the agitator speed in a stirred vessel on the particle size of the solidified catalyst.

FIG. 5 shows the mode particle size ($d_{32}$) and span at different sampling instances in the process of Example 2.

FIG. 6 shows the flow chart of the process of Example 2.

DETAILED DESCRIPTION

Definitions

Figure 1:
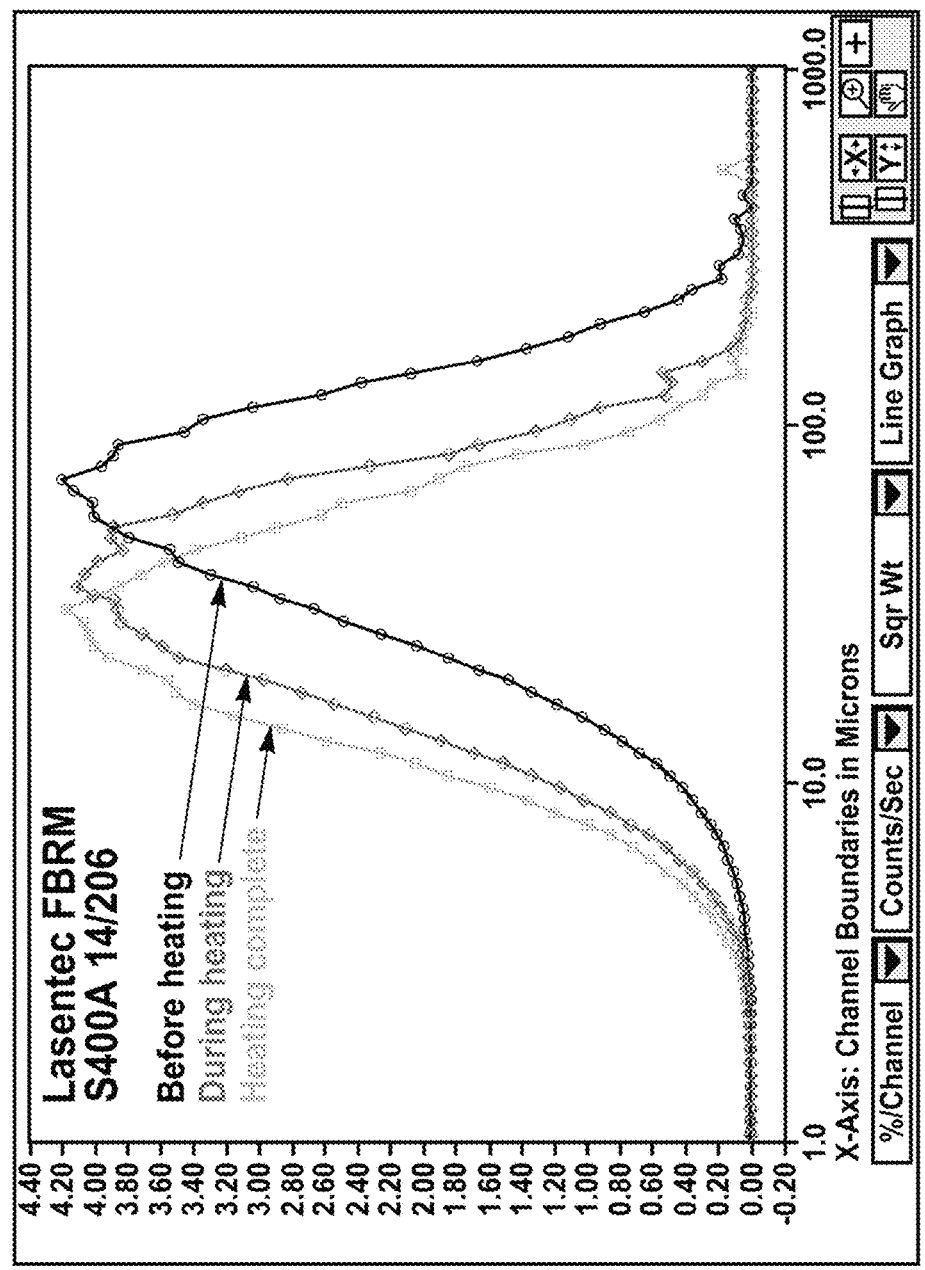
FIG. 1 shows the droplet size distribution of the emulsion and the particle size distribution of the catalyst during solidification during the catalyst synthesis in Example 1.

For an individual particle a number of different diameters can be defined, such as the sieve size, the volume diameter, the surface diameter and the Sauter diameter. These values do not necessarily coincide for non-spherical particles. While the method of the present invention involves controlling the particle diameter it is not critical which one of the diameters is controlled. It is important, however, that the measured data and the target values involve the use of the same diameter. For instance, if the set point value has been given for the Sauter diameter then the Sauter diameter must also be measured. The diameter can thus be chosen as one that conveniently can be measured by the equipment used in monitoring the process.

By average diameter is meant any average diameter obtained from the particle size distribution or the droplet size distribution. As it is well known different averages can be obtained as different moments of the particle size distribution. For instance, the number average particle size is the first moment and the volume average particle size is the third moment.

By median size, often denoted as $d_{50}$, is meant the particle or droplet size separating the higher half of the size distribution from the lower half. At $d_{50}$ the cumulative size distribution function thus has a value of 0.5.

By mode size is meant the particle or droplet size at which the density function of the particle or droplet size distribution has its maximum value.

The present invention is aimed at controlling the particle or droplet size. By this it is meant that a suitable characteristic of the particle or droplet size distribution is controlled. The suitable characteristic may be any average particle or droplet size, the median size or the mode size. It could be also any other parameter that can be measured or derived from the size distribution.

Within the scope of the present invention the terms "target value" and "set point" may be used interchangeably.

The aim of the present invention is to bring the particle size of the catalyst or the droplet size of the emulsion to their set point values. It should be understood that this does not mean that the measured and set point values must be completely equal but that they should be equal within a reasonable accuracy. Practically, the difference between the set point and the measured value cannot be smaller than the experimental accuracy including errors in measurement and sampling. It therefore should be understood that the present invention includes embodiments where no control action is taken when the measured value is essentially close to the set point. In one example, by essentially close to the set point is meant a situation where the interval defined by the mean of the particle size measurements, $d_p$, its standard deviation $s_d$, and the number of measurements n, $[d_p - 1.96 \cdot s_d/\sqrt{n}, d_p + 1.96 \cdot s_d/\sqrt{n}]$, includes the set point. It is possible to replace the term 1.96 in the interval above by the value $\mathcal{T}_{n-1}(0.025)$ which is the quantile $t(0.975)$ of Student's $\mathcal{T}$-distribution and n is the number of measurements. It is also possible to define other limits which are based on the known behaviour of the actual process and the sampling system.

In the process control a set of variables is controlled in the course of the process. Typically measurements are made from these controlled variables and compared to their set points. If the measurements deviate from the set points then a controller acts on a set of manipulated variables which are adjusted, typically so that the difference between the measurement and the set point becomes zero. The controller may be an analogous or digital controller but in some cases it can also be a plant operator. Typically the controller is a digital controller, such as a process computer.

The process of the present invention can be run continuously or batch-wise. By continuous operation it is meant that there is a continuous inflow of reactants into the process and a continuous outflow of the product out of the process. There may be short interruptions in either one or both of the flows but such interruptions are typically short compared with the overall residence time in the process. In a batch-wise process, however, the reactants are introduced at the start of the process, and then the process is allowed to proceed. The product is typically withdrawn at the end of the process. There may be addition of one or more components during preparation of the batch but the product is typically withdrawn only at the end.

Emulsification

In the emulsification stage an emulsion is formed. The emulsion comprises a dispersed phase which is in the form of droplets in a continuous phase. The emulsification stage may be operated either batch-wise or continuously.

Batch-Wise Process

In the embodiment where the emulsification stage is operated batch-wise the catalyst is suitably produced as disclosed in WO-A-2003/000757, WO-A-2003/000754, WO-A-2004/029112, WO-A-2012007430 or WO-A-2007/137853. These catalysts are solid catalysts of spherical particles with compact structure and low surface area of the particles. Further, these catalysts are featured by a uniform distribution of catalytically active sites throughout the catalyst particles. The dispersed phase in the form of liquid droplets of the emulsion forms the catalyst, which is transformed to solid catalyst particles during the solidification step. In the above-mentioned batch-wise operating process a solution of a magnesium compound prepared by reacting an alkoxy magnesium compound and an electron donor or a precursor thereof in a $C_6$-$C_{10}$ aromatic liquid reaction medium. Said magnesium compound is then reacted with a four-valent titanium compound, preferably $TiCl_4$, at a temperature greater than $-10°$ C. and less than $50°$ C. to produce an emulsion of a denser, dispersed phase having Ti/Mg mol ratio 0.1 to 10 in a continuous phase having Ti/Mg mol ratio 10 to 100. The emulsion is then agitated, optionally in the presence of an emulsion stabilizer and/or a turbulence minimizing agent, in order to form droplets of said dispersed phase within the continuous phase and maintain the droplets within a desired size range.

Suitable internal electron donors are, among others, substituted or unsubstituted esters of carboxylic acids or dicarboxylic acids, like phthalates, maleates, benzoates, citraconates, and succinates, 1,3-diethers or oxygen or nitrogen containing silicon compounds. In addition mixtures of donors can be used.

To form a two-phase system the temperature of the mixture must be within the range of from $-10$ to $60°$ C., preferably from 20 to $50°$ C.

The desired droplet size is achieved by agitation. Emulsion stabilizers, which sometimes are also called as surfactants, can be used for improving the droplet size control. Suitable emulsion stabilizers are acrylic or methacrylic polymers, preferably those with ester side chains having from 10 to 30 carbon atoms, more preferably from 12 to 20 carbon atoms. Especially preferred are those with straight-chain esters with from 12 to 20 carbon atoms, such as poly(hexadecyl methacrylate) and poly(octadecyl methacrylate).

Also turbulence minimizing agents may be used. The turbulence minimizing agents are soluble in the continuous phase and they should be inert under the reaction conditions. Suitable turbulence minimizing agents are polymers of alpha-olefin monomers having from 6 to 20 carbon atoms and preferably non-crystalline polymers.

The agitation can be obtained by using any suitable method known in the art. Thus, according to one preferred embodiment the mixture containing the dispersed phase and the continuous phase is transferred into a mixed tank vessel where it is agitated to form the emulsion. The vessel is preferably baffled. Propeller or turbine type impellers may be used for mixing. Good results have been obtained with turbine type impellers. The advantage of mixed vessels is that they are well-known technology.

According to another preferred embodiment the mixture containing the dispersed phase and the continuous phase is passed through at least one rotor-stator system. Such devices are designed to generate high speed mechanical and hydraulic shearing forces in the material within the device. The forces are created by rotating a rotor relative to the stator such that the material is drawn into the rotor-stator assembly and dispersed radially outward from the rotor-stator assembly. Such devices are disclosed, among others, in U.S. Pat. No. 6,000,840 and U.S. Pat. No. 5,632,596. The rotor-stator systems considered here are also sometimes called generators and they include the devices which are sometimes referred to as colloid mills.

In each embodiment above the droplet size is suitably controlled by the tip speed. In each case the correlation between the droplet size and the tip speed depends on the composition of the phases, the reactor and agitator geometry and the temperature. The dependency between the droplet size and the tip speed is suitably determined empirically for the relevant system.

According to one more embodiment of the invention a stream of the mixture containing the dispersed phase and the continuous phase is passed through one or more static mixers. The flow is maintained at a suitable temperature where a two-phase system of the dispersed phase and the continuous phase is present. Suitable static mixers are produced, among others, by Sultzer and Chemineer (Kenics KM). A suitable size of a mixer can easily be selected when the flow rate is known.

Static mixers have the advantage of being a simple apparatus without moving parts. Their disadvantage is the difficulty in controlling the droplet size in case of variations in throughput or other process conditions. It is possible to produce a narrow droplet size distribution by using static mixers. They may have a high pressure drop.

In addition to the methods described above other methods may also be used, for instance homogenizers and ultrasonic devices. A summary of the preparation of emulsions is given, for instance, in Kirk-Othmer, Encyclopedia of Chemical Technology, Second Edition, 1965, pages 137-144.

In batch-wise operation the starting materials, i.e., the solution of the magnesium compound and the electron donor, titanium tetrachloride and optionally the emulsion stabilizer and/or the turbulence stabilizing agent are introduced into the emulsification stage. The mixing is then started and continued until a stable emulsion with desired properties is obtained. Then the emulsion is passed to a solidification stage where the droplets are solidified to solid catalyst particles. The solidification stage may be conducted in the same device as the emulsification stage.

Continuous Process

It is also possible to operate the emulsification stage continuously. The catalyst is then suitably produced as disclosed in WO-A-2006/069733, WO-A-2011/058088, WO-A-2011/058089 or WO-A-2011/058091. In said process an emulsion is formed from a solution of a transition metal component and an organoaluminium compound in toluene which solution is dispersed in a continuous phase formed from an inert solvent immiscible in the dispersed phase. The continuous phase and the solvent do not then form a homogeneous solution but a two-phase system in the conditions prevailing in the emulsification stage.

The methods described above for batch-wise operation can also be used for producing the emulsion continuously. In the continuous production a stream comprising the starting materials is passed to the emulsification stage. Simultaneously, a stream comprising the emulsion is withdrawn from the emulsification stage and passed to the solidification stage.

By the inert solvent immiscible in the dispersed phase is meant a solvent which together with the transition metal component and the organoaluminium compound in toluene does not form a homogeneous solution in the conditions (e.g., temperature and composition) within the emulsification stage. Examples for suitable inert solvents immiscible in the dispersed phase are halogenated hydrocarbon solvents, such as fluorinated hydrocarbon solvents, silicon oils and their mixtures. Especially useful compounds are fluorinated hydrocarbons containing from 1 to 20, preferably from 4 to 10 carbon atoms. Especially perfluorinated hydrocarbons having from 6 to 8 carbon atoms, such as perfluorooctane or perfluoro-1,3-dimethylcyclohexane, have been found to produce good results.

The dispersed phase comprising the solution of the transition metal and the organoaluminium compound in toluene as described above is then directed to an emulsification stage together with the inert solvent immiscible in the dispersed phase. In the emulsification stage an emulsion is formed out of the dispersed phase and the continuous phase into which the dispersed phase is dispersed in the form of droplets.

The emulsification is conducted within a temperature that is no higher than the saturation temperature. The saturation temperature is the temperature below which a two-phase system of the dispersed phase and the continuous phase is formed. Thus, at the operating temperature the solvent(s) present in the dispersed phase should not be soluble in the continuous phase in a significant degree. The saturation temperature is defined as the temperature at and below which the system comprising the solvent of the dispersed phase and the continuous phase forms a two-phase system at the specific composition of the mixture. The saturation temperature is thus a function of the composition of the mixture.

Thus, the temperature in the emulsification stage should be no higher than the saturation temperature, preferably at least 2° C. lower than the saturation temperature, more preferably at least 3° C. lower and especially preferably at least 5° C. lower than the saturation temperature. For example, when toluene is used as the solvent and perfluoro-1,3-dimethylcyclohexane as continuous phase then the saturation temperature is typically less than 50° C. for the composition present in the emulsification stage.

If toluene is used as the solvent in the first liquid and perfluoro-1,3-dimethylcyclohexane as the continuous phase then a suitable temperature range is from −30 to +50° C., preferably from −10 to +20° C. and most preferably from −5 to +10° C.

The amounts of the dispersed phase and the continuous phase are such that the volume of the dispersed phase is less than 50% by volume of the combined amount of the dispersed phase and the continuous phase, preferably from 1 to 40%, more preferably from 2 to 30% and in particular from 5 to 25% by volume.

In the same way as described above for the batch-wise operation emulsion stabilizers can be used also in the continuous operation. The emulsion stabilizer may be any compound that stabilizes the emulsion. It may be a surfactant or an emulsifier which may be used to assist in obtaining a stable emulsion. Suitable surfactants are, for example, halogenated hydrocarbons, such as fluorinated hydrocarbons, which additionally may contain a functional group.

The surfactants and their use are discussed in WO-A-03/051934 from page 11, line 26 to page 14, line 2.

Thus, an especially useful group of emulsion stabilizers is the group of halogenated hydrocarbons, such as fluorinated hydrocarbons, having a functional terminal group. Such compounds may then further be reacted with the organometallic compound of the metal of group 13 or, alternatively, with another compound capable of reacting with it. For example, a highly fluorinated alcohol (such as fluorinated octanol) may be reacted with MAO to produce the emulsion stabilizer.

Solidification

The catalyst particles are obtained after solidifying said droplets of the dispersed phase. The solidification can be done, for instance, by heating. Preferably the temperature at the solidification stage is from 70° C. to 150° C., more preferably form 70° C. to 110° C. and especially preferably from 90° C. to 110° C. It is also possible to introduce an additional component into the emulsion, optionally in combination with heating. Suitable additional components are aliphatic hydrocarbons, for instance those having from 5 to 10, preferably from 5 to 8 carbon atoms.

In the embodiments involving a batch process the solidification stage can take place in the same equipment as the emulsification stage after the emulsification has been completed. Then the temperature is increased or an additional component is introduced, optionally in combination with heating, to effect solidification. It is, however, also possible to transfer the emulsion to another vessel and to solidify the droplets there.

In the embodiments involving continuous solidification a stream of the emulsion is continuously transferred from the emulsification stage to the solidification stage. In the solidification stage the temperature is then increased to the temperature range of from 70° C. to 150° C., preferably form 70° C. to 110° C. and more preferably from 90° C. to 110° C. Advantageously, an additional stream of the inert solvent immiscible in the dispersed phase is introduced into the solidification stage at an elevated temperature of from 70 to 150° C. A stream comprising the solidified particles is then continuously withdrawn from the solidification stage.

Particle Size Analysis

The particle size can be analysed by any suitable method known in the art. In the particle size analysis a sample of the emulsion or the solidified catalyst passes the detector unit of the analyser. The analyser may also comprise a data processing unit which further processes the signal obtained from the detector unit.

The analysis may be conducted as an in-line analysis or an on-line analysis. In the in-line analysis the whole process stream passes the analyser or the analyser measures the whole content of a process vessel. In the on-line analysis a sample stream is taken from the process stream or vessel and the sample stream is analysed. Both methods are equally useful in the present invention.

One especially suitable method involves the use of a camera which photographs either the emulsion or the solid particles or both. The camera unit is installed in the process so that a stream of the process mixture passes the unit and is filmed during the pass. This can be arranged either by withdrawing a sample stream and passing it through the camera unit, or arranging the camera unit in the process stream at a convenient location, or by installing the camera unit within a convenient process vessel, such as the emulsion production vessel or the solidification vessel. Live video is transferred to a computer with image analysing software which then takes snapshots from the video stream and measures the size of the particles. Systems suitable for this purpose are commercially available. Such systems are supplied by JM Canty, Sequip and Pixact.

Another suitable method uses laser diffraction or laser-backscattering for analysing the particle size. Such devices are, for instance, Insitec L & SX analysers, supplied by Malvern (based on laser diffraction) and ParticleTrack by Mettler Toledo (based on FBRM, Focused Beam Reflectance Measurement). Such methods are claimed to give the absolute particle size and generally not to need calibration.

Still one method useful for analysing the particle size is based on ultrasonic extinction. It has the advantage that it can be used when the slurry concentration is high and thus no dilution is needed. It is sensitive to the system measured and thus requires calibration. Instruments based on this principle are, for instance, OPUS by Sympatec GmbH.

According to one preferred embodiment of the present invention the droplet size of the emulsion is measured. In a batch-wise manufacturing method this is the method of choice. The analysis of the particle size of the solidified catalyst would not be useful for control purposes because after the whole batch is solidified it would not be possible to influence the particle size anymore. The measurement of the droplet size is, however, useful also when the catalyst is produced continuously. The droplet size of the emulsion is measured online, and if there is a deviation from a pre-defined set point the process conditions are adjusted accordingly. For instance, the mixing speed may be adjusted by providing faster stirring for smaller droplet size and slower stirring for bigger droplet size. After the targeted size is obtained the solidification of the droplets is performed, i.e. heating of the emulsion is started.

The set point for the droplet size can be obtained, for instance, from historical information of catalyst preparations where both the catalyst particle size and the droplet size had been determined. In principle, emulsion droplet size and catalyst particle size can be measured with the same method or with different methods, allowing selecting the most suitable particle size measurement method/equipment for each of the systems. This is of importance as the requirements for particle size measurement of the emulsion and the dispersion might be different as a consequence of the significantly different properties. However, absolute droplet size values are not needed. This is of relevance as the measured values are often strongly dependent on the particle size measurement method and the optical properties of the two phases of the emulsion, and consequently calibration might be difficult or in many cases not even possible at all.

Based on a simple model it can be concluded that the correlation between the droplet size—and the particle size is mainly dependent on (i) the chemical composition of the droplets $C_{drop}$ and the catalyst particles $C_{Cat}$ ($C_{drop}$ and $C_{Cat}$ are the sums of the concentrations of all the reactive compounds in the droplet and the solid particle, respectively, expressed in weight-%); (ii) the factor $f_{chem}$ (describing changes in the chemical composition during the solidification); (iii) the factor $f_m$ (describing a possible change in morphology during the solidification step, e.g. formation of pores or cavities).

$$r_{Cat} = r_{Drop} * \sqrt[3]{\frac{C_{Drop}}{C_{Cat}}} * f_{chem} * f_m$$

Consequently, in systems where this method is used for controlling the particle size of the catalyst in a wide size range, and where it can be assumed that the factors $f_{chem}$ and $f_m$ are dependent on the mixing conditions, it is beneficial to use a correlation curve where the correlation between droplet size and particle size of the final catalyst is given. Such a correlation curve can for example easily be obtained in laboratory scale experiments by measuring the droplet size of the emulsion before starting solidification and either the particle size of the dispersion after solidification or the particle size of the final catalyst.

A typical behaviour is shown in FIG. 1. It shows the particle size distribution of the solidified catalyst and the droplet size of the corresponding emulsion before the solidification. It is evident from the figure that there is a significant difference between the droplet size and the particle size, the latter being, depending on the catalyst system, about 30% smaller than the former.

When controlling the droplet size it thus must be understood that the droplet size is different from the particle size of the catalyst. The difference between the droplet size and the particle size is affected, as evident from the equation above, by the chemical compositions of the droplet, on one hand, and the particle, on the other hand. In addition the morphology, such as the porosity, of the particle has a significant influence on the size difference.

In principle, all the measuring methods described above may be used when measuring the droplet size of the emulsion.

According to another preferred embodiment of the invention the particle size of the solidified catalyst is measured. This embodiment can be used when producing the catalyst continuously because if the particle size goes out of the specification at any time instance it still is possible to take corrective actions for the subsequent production.

In this embodiment the particle size is suitably determined at the solidification stage or as soon after the solidification stage as possible to eliminate unnecessary dead time in the control loop.

In principle, it is possible to use the same methods for measuring the particle size of the solidified catalyst as for measuring the droplet size of the emulsion.

In FIG. 6 a flow sheet of a continuous process is shown. The dispersed phase including a transition metal compound and methylalumoxane dissolved in toluene and a continuous phase comprising perfluoro-1,3-dimethylcyclohexane are passed into the emulsification stage 1 via lines 10 and 11. The emulsification stage 1 is a rotor-stator unit. From the rotor-stator unit 1 an emulsion stream is withdrawn via line 12 and passed into a solidification unit 2 with additional hot perfluoro-1,3-dimethylcyclohexane, which is passed into the solidification unit 2 via line 13. A stream of slurry comprising the solid catalyst is withdrawn from the solidification unit 2 via line 14 and passed through the video camera unit (=particle size analyser) 3. Then the stream is passed via line 15 into a collection and treatment vessel 4, from where the solid catalyst is recovered via line 16. The particle size analyser 3 then sends a measurement signal to a controller (not shown) which then produces a control signal (not shown) which is used to manipulate the rotation speed of the rotor in the rotor-stator unit 1.

Process Control

The signal from the detector unit is directed to a data processing unit to calculate the size of droplets or particles. The data processing unit may be a part of the size analyser, it may be a separate dedicated computer or it may be a part of the controller. Usually the data processing is conducted by a computer unit integrated with the analyser or a separate computer supplied together with the analyser.

The particle or droplet size as discussed above may be any desired characteristic of the particle size distribution. It may be the average size, the median size, the mode size or any other suitable characteristic of the size distribution.

When the size has been determined then a measurement signal corresponding to the value is generated and transferred from the data processing unit to the controller. The controller compares the measurement signal with a set point value and based on the difference between the two sends a control signal to control one or more manipulated variables of the process.

The at least one manipulated variable is a process variable which influences the droplet size of the emulsion. It may be the rotation speed of the agitator, the tip speed of the rotor or the flow rate of the emulsion through a static mixer, the temperature at the emulsification stage, the feed rate of the emulsion stabilizer or any other process parameter which has a marked influence on the droplet size.

In a preferred embodiment of the invention the emulsion is produced in an agitated vessel. Then preferably at least one of the manipulated variables is the rotation speed of the agitator. The control signal goes then to the motor of the agitator which then based on the signal may turn slower, faster or keep its actual speed.

In another preferred embodiment of the invention the emulsion is produced in rotor-stator equipment. Then preferably at least one of the manipulated variables is the rotor speed. Again, the control signal goes to the motor of the rotor which then based on the signal may rotate slower, faster or keep its actual speed In a further preferred embodiment the emulsion is produced in a static mixer. Then preferably at least one of the manipulated variables is the flow rate of the emulsion through the mixer. The flow rate can then be controlled by a slave controller which manipulates the power of the motor of a pump which pushes the emulsion through the mixer, or the position of a control valve controlling the flow rate of the emulsion.

As it is well understood by the person skilled in the art the measurement of particle size distribution and droplet size distribution may suffer from sampling errors, meaning that the sample which has been measured from the process does not represent the whole population. Therefore, the controller or the data processing unit may request a number of samples to be withdrawn and analysed before the signal is sent to the controller or the controller takes an action. Thus, according to one embodiment a predefined number of samples is analysed and the average of the results is sent to the controller. It is also possible to measure the variance or the confidence interval of the mean according to the methods well known in statistics and if the variance is too high or the confidence interval too broad then additional samples are analysed until the desired variance or confidence interval is reached.

The control method may be any method known in the art. In the simplest form it may be a proportional control (P), or proportional-integral control (PI), or proportional-integral-derivative control (PID). However, it is possible to use more advanced schemes, such as model-based control. Such methods are well-known in the literature.

For instance, in proportional control the measurement signal is suitably scaled and led to the controller. Then the difference between the set point and the scaled measurement signal is calculated and multiplied by a constant. The control signal is then such obtained product. This signal is then scaled to correspond to the operating range of the manipulated variable, which is for instance a frequency converter of the motor operating the agitator in a stirred vessel. Thereby a change in the agitation speed is achieved which then results in a change in the droplet size.

Batch-Wise Process

If the process is conducted batch-wise the droplet size of the emulsion is controlled. It is not, however, the droplet size but the particle size of the solid catalyst which is of technical importance. The droplet size is measured and the measured size is compared with the set point value. The set point is normally obtained from correlation between the droplet size and the particle size of the solid catalyst component. The correlation may originate from the plant history or from laboratory experiments or from a combination of the two. The set point of the particle size of the solid catalyst component can be converted to the set point of the droplet size of the emulsion and the controller then adjusts process, for instance by adjusting the agitator speed, until the difference between the measured droplet size and the set point for the droplet size becomes sufficiently small. When the desired droplet size has been reached and the process has been stable for a sufficient period then the solidification can be started.

In a preferred embodiment using an automatic controller the operator gives a set point for the particle size of the solid catalyst component. The controller then calculates the set point for the droplet size. The droplet size is measured and the measured values are compared with the set point. The controller adjusts the process until droplet size reaches its set point.

Alternatively, the operator may directly give the set point for the droplet size and the controller then adjusts the process to minimize the difference between the measured droplet size and the set point.

Even though it is preferred to control the process automatically, it is possible to control the particle size also manually. In that case the control operators adjust the process to bring the droplet size to its set point.

The measurement signal may be treated in any means known in the art, for instance to reduce the variation between consecutive measurements. Such methods include, but are not limited to, filtering, averaging, mathematical manipulation and delaying.

Continuous Process

If the process is conducted continuously then the droplet size of the emulsion, the particle size of the final catalyst or both of them are controlled.

The control of the droplet size can be conducted as was described above for the batch-wise process. Obviously, however, the start of the solidification cannot be delayed until the desired droplet size is obtained, as was done in the batch-wise process, but instead a continuous stream is withdrawn from the emulsification stage.

If the catalyst particle size is controlled, the measurement signal corresponding to the size of the catalyst particles is directed to the controller which compares the signal with the set point. The controller then sends a signal to adjust the at least one manipulated variable. The controller may then adjust directly one of the variables listed above.

However, if also the emulsion droplet size is controlled then it is possible that the particle size control and the droplet size control are set in a cascade. Then the particle size controller sends the set point to the droplet size controller. This embodiment has the advantage that an accurate correlation between the particle size and the droplet size is not needed but the primary controller controlling the particle size automatically adjusts the set point of the slave controller controlling the droplet size such that the desired particle size is produced.

Use of the Catalyst

The thus obtained catalysts can be used in olefin polymerization. For instance, the catalyst comprising magnesium and titanium compounds may be used in polymerization of propylene or ethylene together with an alkylaluminium cocatalyst and an external donor, which preferably is an alkoxysilane compound. The resulting polymer has a well-defined particle size distribution. The polymerization process runs smoothly without problems in transferring the polymer powder in the process.

Description of Methods

Droplet Size of the Emulsion and Particle Size of the Solidified Catalyst

The droplet size of the emulsion was measured with the Lasentec laboratory equipment Lasentec FBRM S400A (14 mm×206 mm probe with high-speed scanning optics).

The Lasentec probe was installed in the glass reactor through a rubber seal (Fitting, 14 mm bore for 19 mm lab joint).

The probe was positioned so that the tip of the probe was about 3 cm above the impeller and close to the reactor wall. The angle between the window of the Lasentec probe and the liquid flow was about 10°.

Scanning time of the Lasentec was set to 2 second to ensure enough samples for reliable PSD. Number of counts per second in the emulsion was above 3000 (should be at least over about 2000 for reliable results).

For measuring the particle size of the solid catalyst in the suspension the number of counts per second was set to above 10000.

Monitoring and data collection was handled by Lasentec software "Lasentec FBRM Acquisition".

Particle Size of the Catalyst

The particle size of the catalyst was analysed by in-line particle size camera supplied by JM Canty. Gap between sight glasses was the factory default of 3.69 mm and it was not changed during tests. Live video feed from camera was transferred by using one gigabyte (1 GB) Ethernet connection to the Cantyvision software where all the data analysis, monitoring and data collection are done.

Light bulb inside the lightning unit was 80 watt halogen. Lightning was controlled using voltage regulator from 12 Volts to 31 Volts.

Before use the camera was calibrated using calibration plate provided by manufacturer. Plate contained 100 µm grid. Plate was installed in the light source end and camera object was zoomed and focused on the plate. Zoom was adjusted so that screen (picture) width (1620 pixels) was equal to 401 µm.

EXAMPLES

Example 1

A solution comprising the magnesium compound was produced by adding under stirring 55.8 kg of a 20% solution in toluene of BOMAG-A to 19.4 kg 2-ethylhexanol in a 15 dm³ steel reactor. During the addition the reactor contents were maintained at a temperature of lower than 20° C. The temperature of the reaction mixture was then increased to 60° C. and held at that level for 30 minutes under stirring, at which time the reaction was complete. 5.5 kg of phthaloyl dichloride was then added and the reaction mixture was maintained at 60° C. under stirring for 30 more minutes. After cooling to the room temperature a yellow solution was obtained.

Then 19.5 ml titanium tetrachloride was placed in a 300 ml glass reactor equipped with a mechanical stirrer. Mixing speed was first adjusted to 130 rpm. After addition of 10 ml n-heptane 1.0 ml solution of 3.0 mg polydecene in toluene and 2.0 ml Viscoplex 1-254, 32 mg of the magnesium compound prepared above was added to the stirred reaction mixture over a 10 minute period. During the addition of the magnesium compound the temperature was maintained below 30° C.

During the preparation of the emulsion the droplet size of the emulsion was measured with the Lasentec laboratory equipment Lasentec FBRM S400A. Furthermore, the particle size of the solid catalyst component was measured in dispersion during the solidification by using the same instrument as described above.

The set point of for the particle size of the solid catalyst component was chosen as 45 μm. Based on earlier experience this was known to correspond to the droplet size of the emulsion of 72 μm. The mixing speed was adjusted to reach the desired droplet size which was reached with a mixing speed of 170 rpm.

Figure 2:
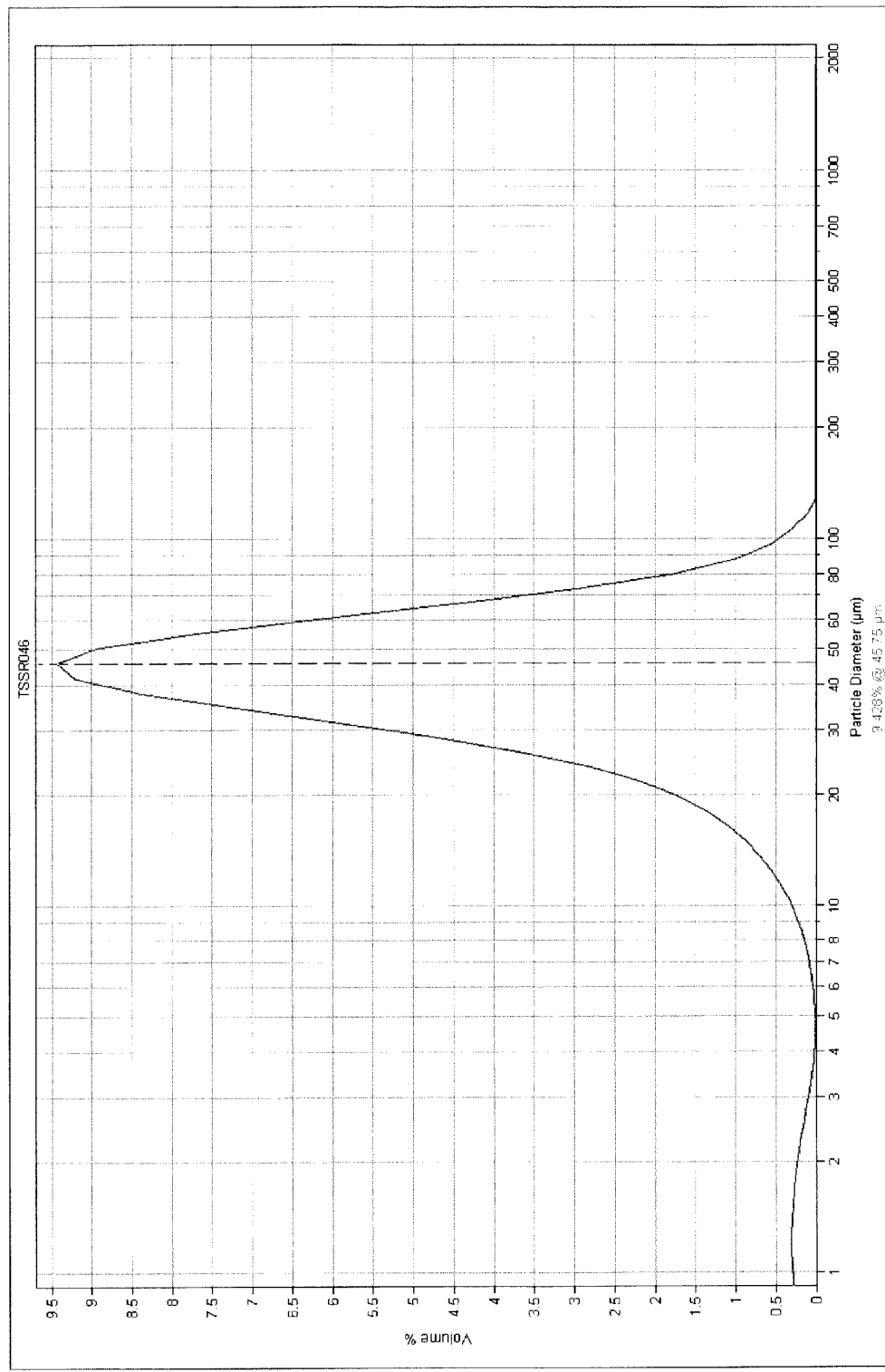
FIG. 2 shows the particle size distribution of the final catalyst of the Example 1 after washing and drying.

The reaction mixture was then heated to 90° C. over a period of 20 minutes and after reaching 90° C. the temperature was maintained there for 30 minutes under stirring. Then the agitation was stopped, the solids were allowed to settle and the liquid was decanted. Then the solid catalyst was washed at 90° C. for 30 minutes with 100 ml toluene into which 1.0 ml of diethylaluminium chloride had been added. The liquid was removed and the catalyst was first washed with 60 ml of heptane for 20 minutes at 90° C. and then with 60 ml of pentane for 10 minutes at 25° C. Then the solid catalyst was dried by purging nitrogen at 60° C. to yield a yellow, air-sensitive powder. FIG. 1 shows the droplet size distribution in the emulsification stage and the particle size distribution in the solidification stage. Furthermore, FIG. 2 shows the particle size distribution of the final catalyst by using a Coulter instrument.

The resulting catalyst was analysed and found to have an average particle size of 46 μm and a porosity of 0.3 ml/g.

Example 2

The procedure of Example 1 was otherwise repeated but the set point for the catalyst particle size was set to 50 μm. Further, Ondina 68 oil was added to the mixture together with BOMAG-A. The primary controller adjusted the set point for droplet size to 80 μm. The resulting catalyst had porosity of 0.5 ml/g and the average particle size of 51 μm.

Example 3

The procedure of Example 2 was repeated but the set point for the catalyst particle size was set to 55 μm and the amount of Ondina 68 oil was increased. The primary controller gave the set point for the droplet size of 85 μm. The resulting catalyst had porosity of 0.8 ml/g and the average particle size of 54 μm.

Example 4

4a. Preparation of Solution

Into an agitated vessel having a capacity of 88 liters were introduced, 0.79 kg of a transition metal compound rac-dimethylsilanediyl-bis(2-methyl-4-phenylindenyl) zirconium dichloride and 41.5 kg of a solution of MAO in 30 weight-% in toluene (the solution containing about 27% MAO and about 5% trimethylaluminium). In addition perfluorooctylpropeneoxide was added as a surfactant so that its content in the mixture was 24.7% by weight. They were mixed for a period of one hour at a temperature of −10° C.

4b. Preparation of Emulsion

The solution described above was introduced at a rate of 5 kg/h into a continuously operating working chamber of an IKA Process-Pilot 2000/4 with 6F rotor-stator design. The feed of perfluoro-1,3-dimethylcyclohexane was 75 kg/h. The emulsification chamber was maintained at a temperature of +5° C.

4c. Solidification

The emulsion was continuously removed from the emulsification chamber and passed into a solidification stage. This was a pipe junction where additionally 400 kg/h of perfluoro-1,3-dimethylcyclohexane having a temperature of 75° C. was added. The inner diameter of the pipe was 19 mm. The solidification occurred and a suspension of solid catalyst particles in perfluoro-1,3-dimethylcyclohexane was formed. The suspension was withdrawn continuously from the solidification stage and passed through an in-line camera unit into a separation stage.

The set point for the particle size was 40 μm. The particle size of the catalyst was measured and the speed of the rotor was adjusted to reach the target particle size. FIG. 5 shows the size (mode size) of the particles during the production run at each sampling instance.

4d. Separation

The suspension was directed to a separation vessel operating at 70° C. From the bottom of the vessel a liquid flow of 490 kg/h was continuously withdrawn. From the surface a suspension flow of about 3 kg/h was withdrawn containing about 45% by weight of solid catalyst in the perfluoro-1,3-dimethylcyclohexane/toluene solution. The resulting solid catalyst component was collected and sent to further treatment.

The invention claimed is:

1. A process for producing a solid olefin polymerization catalyst component from an emulsion comprising the steps of:
   (i) providing a set point for a particle size of the solid olefin polymerization catalyst component to a first controller;
   (ii) producing in an emulsification stage an emulsion comprising droplets of a dispersed phase in a continuous phase, the droplets comprising a transition metal compound, wherein the production of the emulsification stage is controlled by a second controller, and wherein the second controller controls at least one manipulated variable;
   (iii) solidifying the droplets to produce the solid olefin polymerization catalyst component in a solidification stage;
   (iv) measuring the particle size of the solid olefin polymerization catalyst component in or after said solidification stage and determining a measured size for the particles from said measurement;
   (v) calculating a difference between said set point for the particle size of the solid olefin polymerization catalyst and said measured size for the particles of the solid olefin polymerization catalyst; and
   (vi) establishing a control signal based on said difference and using said control signal for adjusting at least one manipulated variable via the second controller, wherein the at least one manipulated variable is a process variable which influences the droplet size of the emulsion.

2. The process according to claim 1 wherein the process is conducted continuously by introducing a stream comprising the starting materials into the emulsification stage, withdrawing a stream comprising the emulsion from the emulsification stage, passing the stream comprising the emulsion into the solidification stage, and withdrawing a stream comprising solid catalyst particles from the solidification stage.

3. The process according to claim 1 wherein the emulsification stage is conducted in an agitated vessel comprising an agitator.

4. The process according to claim 3 wherein the at least one manipulated variable comprises the rotation speed of the agitator.

5. The process according to claim 1 wherein the emulsification stage is conducted in rotor-stator equipment.

6. The process according to claim 5 wherein the at least one manipulated variable comprises the rotation speed of the rotor.

7. The process according to claim 1 wherein the emulsification stage is conducted in a static mixer.

8. The process according to claim 7 wherein the at least one manipulated variable comprises the flow rate of the emulsion through the static mixer.

9. The process according to claim 1 wherein the step of measuring the particle or droplet size comprises a step of photographing the particles or the droplets, or determining the size by laser diffraction, laser backscattering or by ultrasonic extinction.

10. The process according to claim 1 comprising the additional steps of:
providing a signal corresponding to the set point to the first controller;
establishing a signal proportional to the measured size for the particles or droplets;
directing the signal proportional to the measured size of particles or droplets to the first controller;
calculating the difference between the signal proportional to the set point and the signal proportional to the measured size of particles or droplets;
establishing the control signal based on said difference.

11. The process according to claim 1 comprising the step of recovering the solid olefin polymerization catalyst component.

12. The process according to claim 1 comprising repeating steps (ii)-(vi) until the measured particle size for the solid olefin polymerization catalyst is equal to the set point for the particle size of the solid olefin polymerization catalyst.

* * * * *